United States Patent [19]

Kessinger et al.

[11] 4,254,668
[45] Mar. 10, 1981

[54] ENGINE FLYWHEEL AND INTERCONNECTING DRIVE SHAFT

[75] Inventors: Orville E. Kessinger; Ivan R. Lamport, both of Peoria, Ill.

[73] Assignee: Caterpillar Tractor Co., Peoria, Ill.

[21] Appl. No.: 2,625

[22] Filed: Jan. 11, 1979

Related U.S. Application Data

[63] Continuation of Ser. No. 816,627, Jul. 18, 1977, abandoned.

[51] Int. Cl.³ .......................... G05G 1/00; G05G 3/00
[52] U.S. Cl. ............................................. 74/572; 74/64
[58] Field of Search .................. 74/572, 63, 573 R, 64, 74/574; 64/23, 9 R; 192/70.19, 70.2; 123/192 B

[56] References Cited

U.S. PATENT DOCUMENTS

| | | | |
|---|---|---|---|
| 1,035,421 | 8/1912 | Coppins | 287/DIG. 7 |
| 2,076,438 | 4/1937 | Wooler | 74/572 |
| 2,136,125 | 11/1938 | Delaval-Crow | 287/DIG. 7 |
| 2,142,021 | 12/1938 | Ernst et al. | 74/573 |
| 2,192,301 | 3/1940 | Eason | 192/70.19 |
| 2,369,679 | 2/1945 | Matteucci | 74/574 |
| 2,394,448 | 2/1946 | Herold et al. | 64/23 X |
| 2,500,366 | 3/1950 | Lamberton | 74/572 |
| 2,539,387 | 1/1951 | Alden | 403/359 X |
| 2,698,013 | 12/1954 | Brill et al. | 64/9 R |
| 2,723,572 | 11/1955 | Bornzin | 74/572 |
| 2,835,141 | 5/1958 | De Lorean | 74/572 |
| 2,909,045 | 10/1959 | Burns | 64/9 R |
| 2,943,503 | 7/1960 | Förster | 74/572 |
| 3,023,636 | 3/1962 | Kelley et al. | 74/572 X |
| 3,159,987 | 12/1964 | Thompson et al. | 74/574 X |
| 3,174,602 | 3/1965 | Schjolin | 192/70.2 |
| 3,234,758 | 2/1966 | Lewis | 64/23 |
| 3,657,903 | 4/1972 | Woodling | 64/23 |
| 3,862,677 | 1/1975 | Bahr | 74/572 |
| 3,889,780 | 6/1975 | Dison | 74/606 R |
| 3,964,342 | 6/1976 | Beam, Jr. et al. | 74/573 R |
| 3,972,397 | 8/1976 | Cheek | 192/70.19 |
| 4,128,022 | 12/1978 | Ritter | 64/9 R |

FOREIGN PATENT DOCUMENTS

| | | |
|---|---|---|
| 824814 | 12/1959 | United Kingdom . |
| 846736 | 8/1960 | United Kingdom . |
| 884436 | 12/1961 | United Kingdom . |
| 1013142 | 12/1965 | United Kingdom . |
| 1176435 | 1/1970 | United Kingdom . |
| 1462318 | 1/1977 | United Kingdom . |

Primary Examiner—Leslie Braun
Attorney, Agent, or Firm—Phillips, Morre, Weissenberger, Lempio & Majestic

[57] ABSTRACT

A symmetrical splined drive shaft interconnects a specially configured socketed flywheel with the drive train of a vehicle. The socketed flywheel is formed to receive a retaining ring so that when a portion of the flywheel housing and the drive train are separated from the remaining portion of the flywheel housing encompassing the flywheel the symmetrical splined drive shaft disposed in the flywheel socket remains associated with the specially configured flywheel. The splining is formed to allow limited misalignment of the driving shaft and the driven drive train while an axial bore through the symmetrical shaft communicates lubricant from the drive train to the spline remote of the drive train.

6 Claims, 1 Drawing Figure

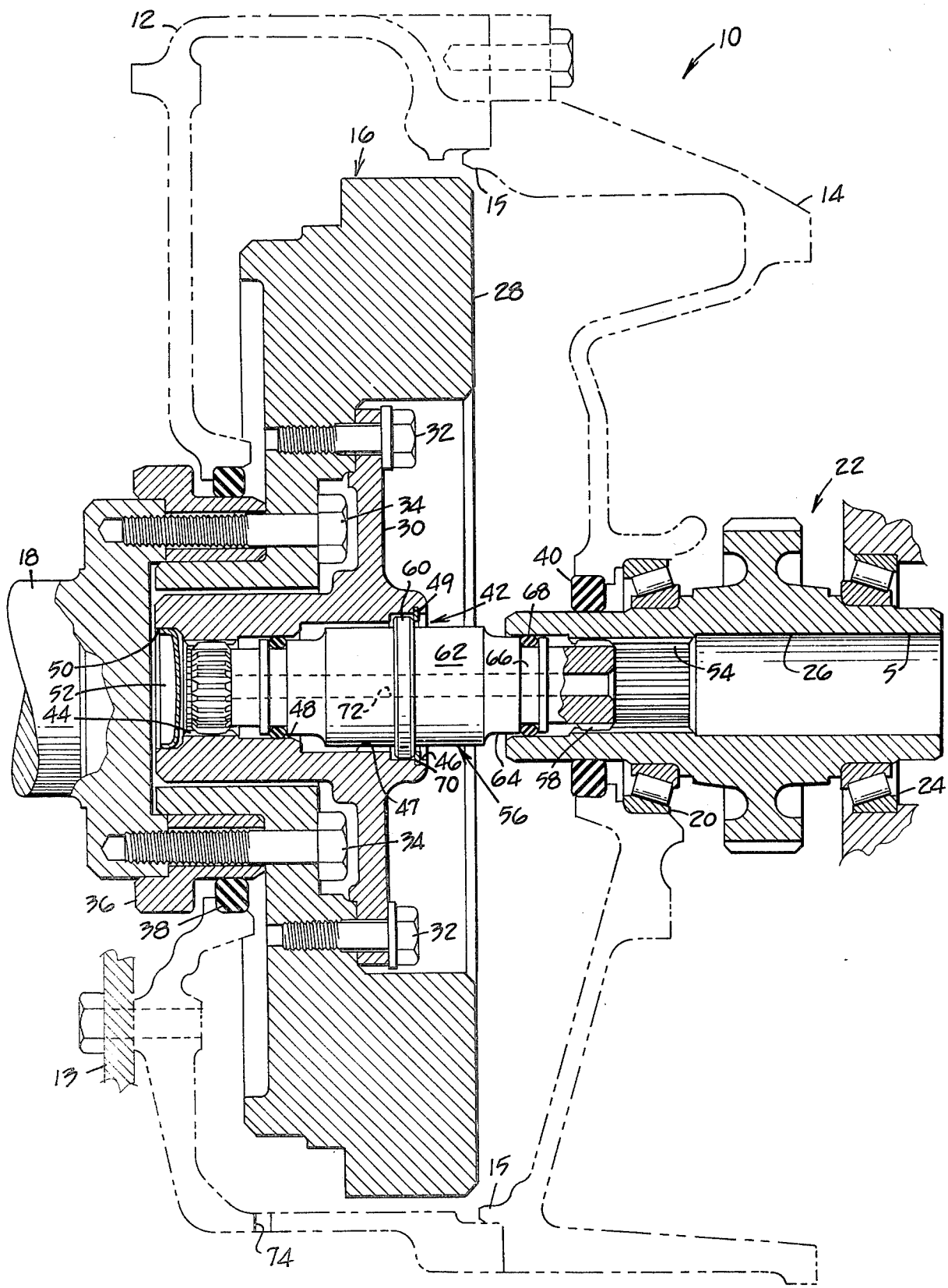

ENGINE FLYWHEEL AND INTERCONNECTING DRIVE SHAFT

This is a continuation of Ser. No. 816,627, filed July 18, 1977 now abandoned.

BACKGROUND OF THE INVENTION

This invention relates to means for drivingly interconnecting a first assembly to a second assembly. In particular it relates to interconnecting the flywheel of a heavy construction vehicle to a hydrostatic transmission in the vehicle.

Interconnection of the power plant of a vehicle to the drive train of the vehicle presents a unique problem in alignment since the drive train which usually includes a transmission is usually a separate unit from the vehicle engine. Since any misalignment between the power plant and the vehicle drive train results in friction losses during operation of the power plant and drive train, minimization of the misalignment is not only desirable, but necessary. In certain instances it has been found appropriate to utilize flexible or resilient members between the power plant and the vehicle transmission. However, such flexible members can impart an undesirable load to the associated bearings causing premature failure.

Flexible or resilient interconnecting means between the vehicle engine and the vehicle drive train also present problems in assembly of the two components. It is generally necessary to provide access to both sides of the flexible member if the flexible member is to be disassembled in the field. However, since the flexible member may be molded, it may be more appropriate to provide a disassembly point on either side of the flexible member. In any event, the flexible member is an expedient that has not proved in all cases to be appropriate.

Space and weight are generally problems in the construction of any type of vehicle. The drive train length should therefore be made as short as possible commensurate with with vehicle design without loss of efficiency. It is also important in internal combustion engines to include a large rotating mass to provide momentum to the engine crank shaft. This can be accomplished in any one of a number of ways. For example, in an aircraft engine the mass may be in the form of a propeller. In certain types of heavy equipment, the mass may be a large rotating portion of the drive train. In many engines it is appropriate to include a flywheel affixed to the crank shaft. In those engines which include a flywheel affixed to the crank shaft, connection of the engine flywheel to the transmission has been accomplished in some installations through the use of the resilient flexible fitting noted above. Since the entire drive train is generally separated from the engine at a point proximate the flywheel, it has proved appropriate to form the flywheel housing in two portions so that the drive train and transmission may be separated coincident with the separation of the flywheel housing. This type of separation may introduce a misalignment problem between the transmission and the flywheel. Accordingly, such misalignment should be readily absorbed in the interconnecting drive member. If the interconnecting drive member were such that separation of the transmission required a separate effort on the part of the separating mechanic to disconnect the interconnecting drive member, the length which is important, and in some instances critical, would of necessity be increased. Accordingly, it is appropriate to design the interconnecting drive member with the shortest possible length.

In providing a short length interconnecting link between a flywheel and a transmission, it would be desirable for the interconnecting link to remain with either the flywheel or the transmission during disconnection of one from the other. As a corollary function to a retention means to meet this need, it has been found that the retention means may prevent a sheared interconnecting shaft from disassociating itself from the flywheel in the event of failure of the shaft.

Finally, in design of any machinery element, it is appropriate to prevent errors which may take place during assembly. Such errors in a non-symmetrical shaft member which has similar but not identical construction at both ends may occur when the mechanic inadvertently places the non-symmetrical drive shaft in the machine in the wrong orientation. The most common way to prevent an assembly error is to insure that the two ends of the shaft are visually dissimilar. This has the inherent drawback that the assembling mechanic may be forced to refer to an assembly drawing to determine the proper orientation of the part. A second means for insuring proper orientation at assembly is to utilize similar structure at either end of an interconnecting shaft but to differ the shaft dimension so that assembly is only possible in one orientation. This type of structure results in the drawback that a minor dimension difference could result in a mechanic attempting to force assembly of the structure.

The most appropriate type of structure is a symmetrical interconnecting drive shaft so that installation is not hampered by different shapes or different dimensions. In short the mechanic may place the shaft in either orientation without fear of failure.

SUMMARY OF THE INVENTION

The present invention is directed to overcoming one or more of the problems as set forth above.

Broadly stated, the invention is a drive connection comprising a housing having a first portion and a second portion. A first assembly is mounted for rotation in the first portion and includes an axially socketed drive means. A second assembly is mounted for rotation in the second portion. Positionable in the axially socketed drive means for drivingly connecting the first assembly with the second assembly is a symmetrical splined drive shaft. Retention means are provided for retaining the drive shaft relative the first assembly.

BRIEF DESCRIPTION OF THE DRAWING

The sole FIGURE accompanying this application depicts partly in section an elevation view of the drive connection which is the subject of this invention.

DETAILED DESCRIPTION

Depicted in the sole drawing, is a housing 10 comprised of a first portion 12 which may be affixed to a frame 13 by bolts or the like and a second portion 14 which may be substantially aligned with first portion 12 by means such as flange 15 or the like and affixed thereto by bolt means or the like. First portion 12 of housing 10 substantially encompasses a first assembly mounted for rotation therein and which includes flywheel assembly 16 driven by a drive shaft 18. Drive shaft 18 may be the extension of a crankshaft of an internal combustion engine such as a diesel engine or the like.

Journaled for rotation in second portion 14 by a bearing such as tapered bearing 20 is a second assembly including driven member 22 which may drive a transmission such as a hydrostatic transmission or the like. Driven member 22 is in substantial axial alignment with flywheel assembly 16. Other bearing means such as tapered bearing 24 may further support driven member 22. Driven member 22 may be associated with a source of lubricant under relatively low pressure such as 5 lbs. per square inch ($3.5 \times 10^4$ Pa), such lubricant being provided to an axial bore 26 formed in driven member 22.

Flywheel assembly 16 may be formed of a first portion 28 and a second portion 30 affixed to first portion 28 by a plurality of bolts 32. First portion 28 may in turn be affixed to drive shaft 18 by a plurality of bolts 34. A sealing member 36 may be disposed between flywheel first portion 28 and drive shaft 18 so that an oil seal 38 may be utilized between first portion 12 of housing 10 and sealing member 36. A similar oil seal 40 may be disposed between driven member 22 and second portion 14 of housing 10.

Flywheel second portion 30 is formed with a stepped axial bore 42 which terminates generally with an internal spline 44 at the end proximate drive shaft 18 and which serves to receive one end of a symmetrical splined drive shaft 56. The stepped axial bore 42 is formed with a first counterbore 46 at the end distal of internal spline 44. Intermediate the end of axial bore 42 is a counterbore 47 of relatively less diameter than counterbore 46 which in turn is followed by a third counterbore 48 distal of counterbore 46 and of relatively less diameter than counterbore 47. Formed in counterbore 46 and proximate the outer end thereof is an annular groove 49, the purpose of which will become apparent in the following discussion. Proximate internal spline 44 and formed in flywheel second portion 30, is a counterbore 50 in which a cup-like plug 52 may be disposed to retain oil, as will become apparent in the ensuing discussion.

Axial bore 26 of driven member 22 has formed at the end adjacent second portion of housing 10 an internal spline 54 adapted to receive the other end of the symmetrical splined drive shaft 56 thus interconnecting the first assembly or flywheel assembly 16 with the second assembly or assembly 22.

Symmetrical splined drive shaft 56 is formed with a spline 58 at either end thereof which serve to allow a small misalignment between the flywheel assembly 16 and the driven assembly 22. Since drive shaft 56 is symmetrical, it is appropriate to refer to the features of one end only. The symmetry of the splined drive shaft permits installation, either as indicated in the figure or in a reverse of the indication in the figure. Thus, the spline 58 may mate either with the spline 54 of the driven member or the spline 44 of the second portion 30 of flywheel assembly 16. The symmetrical splined drive shaft 56 has formed generally at the mid-point thereof a shoulder 60 circumferentially surrounding the drive shaft. Shoulder 60 is formed on center portion 62 of drive shaft 56. Center section 62 extends in either direction from shoulder 60 to an intermediate portion 64 of drive shaft 56 and of lesser diameter than center section 62. Intermediate portions 64 are adapted to fit either the axial bore 26 of the driven member 22 or the third counterbore 48 of flywheel second portion 30, while the center portion 62 is adapted to be received in the second counterbore 47 of the flywheel second portion with the shoulder 60 adapted to be received in the first counterbore 46 of the flywheel second portion.

An annular groove 66 is formed in each intermediate portion 64 and may have disposed therein a seal member such as O-ring 68. O-ring 68 serves to seal axial bore 26 of driven assembly 22 and the corresponding O-ring 68, when disposed in third counterbore 48, serves to seal stepped third axial bore 42 of second portion 30. Finally, the symmetrical splined drive shaft, as previously noted is formed with splines 58 on either end thereof adapted to mate with either splines 44 or 54.

In use the symmetrical splined shaft is positioned in the socketed flywheel second portion 30, as indicated in the figure, and retained therein by a retention means such as split ring 70 disposed in annular groove 49. At the opposite end splines 58 mate with splines 54 of driven member 22. The splines 58 mating with the flywheel second portion splines 44 are lubricated by an axial bore 72, communicating lubricating fluid from axial bore 26 of driven member 22 to the splines 44. The cup-like plug 52 serves to retain the lubricating fluid in the vicinity of the splines 44. Due to the limited amount of friction developed in this coupling, a pressurized lubricating system is not necessary. However, the slight pressure maintained in axial bore 26 is sufficient to provide lubricant to the splines. Since housing 10 may be a dry housing, that is a housing in which lubricant is not accumulated, a drain port 74 may be provided to drain leakage lubricant from housing 10. It should be apparent to those in the art that the use of the splines 58 on the symmetrical drive shaft and the mating with the splines 44 and 54 allows for a certain degree of misalignment between the flywheel's second portion 30 and the driven member 22 without imparting an unnecessary load to either the bearing 20 or the bearing 24. In addition to the normal spline 58, it has been found appropriate to provide a certain degree of "crowning" to each spline which may be seen in exaggerated form in the drawing as the curved outer portion of the spline. This crowning allows for a certain additional amount of misalignment between the two elements, as noted above.

The split ring 70 serves several useful purposes. During assembly, the symmetrical aplined drive shaft 56 is positioned in the flywheel second portion. As previously noted, the symmetry of the splined drive shaft is such that a mechanic need not worry about which end is positioned in the socketed flywheel second portion 30. The socketed portion permits lubricant to be received at the splined end through the hollow splined drive shaft 56 while a split ring 70 is positioned in the annular groove 49 to act on shoulder 60. Thus, the symmetrical splined drive shaft 56 is retained in the flywheel second portion in the manner indicated in the FIGURE. The driven member 22 and the housing 14, which may have been previously preassembled, may then be mated with the symmetrical drive shaft 56 with the spline 58 mating with the spline 54 of the driven member. During this assembly it should be apparent that the symmetrical splined drive shaft 56 will be retained in the flywheel second portion 30 thus preventing damage occurring to the splines during such assembly or if the drive shaft were inadvertently dropped during subsequent withdrawal of the driven member.

In the past, it has been appropriate to provide access to the interconnecting means analagous to symmetrical splined drive shaft 56 before the driven member is disassembled for the driving member in order to prevent damage to the interconnecting member. This is obviated in this invention by providing the elongated symmetrical splined drive shaft fitted in the socketed flywheel second portion and retained therein by retainer 70. Finally, the retainer 70 serves to retain a portion of the symmetrical splined drive shaft 56 in the event the splined drive shaft is sheared during operation. Since shear would normally occur at the smallest diameter point, that is annular groove 56, a break at either annular groove will retain at least the major portion of the symmetrical splined drive shaft 56 within the flywheel second portion without the remaining portion damaging the flywheel housing or the like.

Although this invention has been described in relation to a particular embodiment, it is considered that the invention should be not so limited, but rather should be limited only by the appended claims.

Embodiments of the invention in which an exclusive property or privilege is claimed are defined as follows:

1. A drive connection comprising:
    a housing having a first portion and a second portion, said second portion removably associatable with said first portion;
    a drive shaft rotatably mounted in said first portion of the housing;
    a flywheel first portion removably affixed said drive shaft and rotatable in said housing;
    an axially socketed second portion axially disposed in said flywheel first portion for rotation therewith, said axially socketed second portion defining an axial bore with at least a portion of said axial bore having a plurality of inwardly extending splines;
    a symmetric splined drive shaft drivingly positionable in said axially socketed second portion for drivingly connecting said axially socketed second portion with said second assembly, said splined drive shaft defining an axial bore therethrough;
    retention means for fixedly retaining said drive shaft in said axially socketed second portion;
    cap means for sealing the end of the axial bore of the axially socketed second portion adjacent the drive shaft; and
    a first seal member disposed about said splined drive shaft interior of the axial bore of said axially socketed second portion;
    said second portion of said housing including a source of lubricant, said splined drive shaft defining an enlarged center portion forming a shoulder generally at the midpoint thereof, said shoulder circumferentially surrounding said splined drive shaft and positionable in said axial bore of socketed second portion, said axial bore of said splined drive shaft for communicating lubricant from said second assembly to said axial bore of said socketed second portion.

2. The drive connection of claim 1 wherein the axial bore of the socketed second portion includes an annular groove adjacent a first end thereof, said first end proximate the second assembly, and further wherein the retention means comprises a split ring resiliently positionable in said annular groove in an abutting relation with the splined drive shaft shoulder whereby said splined drive shaft shoulder is retained relative said socketed second portion.

3. A drive connection comprising a housing having a first portion and a second portion, said second portion removably associatable with said first portion;
    a first assembly mounted for rotation in said first portion;
    a second assembly mounted for rotation in said second portion of said housing and substantially axially aligned with said first assembly, said second assembly including a source of lubricant;
    a symmetrical splined drive shaft drivingly positionable in said first assembly and drivingly connecting said first assembly with said second assembly; and
    retention means for fixedly retaining said splined drive shaft in said first assembly;
    said first assembly including a drive shaft rotatingly mounted in the first portion of the housing; and further wherein the first assembly includes a flywheel first portion removably affixed to said drive shaft and rotatable in said housing, and an axially socketed second portion axially disposed in said flywheel first portion for rotation therewith;
    said axially socketed second portion defining an axial bore with at least a portion of said axial bore having a plurality of inwardly extending splines adapted to receive either end of the splined drive shaft;
    said splined drive shaft defining an axial bore and an enlarged center portion, said enlarged center portion forming a shoulder generally at the midpoint of said splined drive shaft, said shoulder circumferentially surrounding said splined drive shaft and positionable in the axial bore of the socketed second portion of the flywheel assembly, said axial bore of said splined drive shaft for communicating lubricant from the second assembly to the axial bore of the socketed second portion.

4. The drive connection of claim 1 wherein the axial bore of the socketed second portion of the flywheel means includes an annular groove adjacent a first end thereof, said first end proximate the second assembly, and further wherein the retention means comprises a split ring resiliently positionable in said annular groove in abutting relation with the splined drive shaft shoulder whereby said splined drive shaft shoulder is retained relative said socketed second portion of the flywheel means.

5. The drive connection of claim 4 further comprising cap means for sealing the second opposite end of the axial bore of the socketed second portion of the flywheel means, and the splined drive shaft means further comprising a first seal member disposed about said splined drive shaft interior of the axial bore of said socketed second portion and second seal means disposed about said splined drive shaft interior of the second assembly.

6. The drive connection of claim 1 wherein the second assembly includes a hollow shaft portion splined internally to receive either end of the splined drive shaft, the source of lubricant communicated to said hollow shaft portion.

* * * * *

UNITED STATES PATENT AND TRADEMARK OFFICE
CERTIFICATE OF CORRECTION

PATENT NO. : 4,254,668
DATED : March 10, 1981
INVENTOR(S) : Kessinger et al.

It is certified that error appears in the above-identified patent and that said Letters Patent are hereby corrected as shown below:

Claim 4, line 1, delete "1" and substitute therefor --3--;

Claim 6, line 1, delete "1" and substitute therefor --3--.

Signed and Sealed this

*Third* Day of *November 1981*

[SEAL]

*Attest:*

GERALD J. MOSSINGHOFF

*Attesting Officer*     *Commissioner of Patents and Trademarks*